US008087718B2

(12) United States Patent
Bengtsson et al.

(10) Patent No.: US 8,087,718 B2
(45) Date of Patent: Jan. 3, 2012

(54) ARRANGEMENT FOR SUSPENSION OF AN OPERATOR CAB ON A WORK MACHINE FRAME

(75) Inventors: Kjell-Ewe Bengtsson, Eskilstuna (SE); Jonny Lindblom, Eskilstuna (SE); Allan Ericsson, Västerås (SE); Tonie Jurgec, Eskilstuna (SE); Ulf Hentschel, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 114 days.

(21) Appl. No.: 12/293,560

(22) PCT Filed: Apr. 12, 2006

(86) PCT No.: PCT/SE2006/000437
§ 371 (c)(1),
(2), (4) Date: Sep. 19, 2008

(87) PCT Pub. No.: WO2007/117183
PCT Pub. Date: Oct. 18, 2007

(65) Prior Publication Data
US 2010/0257758 A1 Oct. 14, 2010

(51) Int. Cl.
*B62D 33/10* (2006.01)
(52) U.S. Cl. ............ 296/190.07; 296/193.03; 180/89.13
(58) Field of Classification Search ............ 296/190.03, 296/190.04, 190.07; 180/89.13
See application file for complete search history.

(56) References Cited

U.S. PATENT DOCUMENTS

| 4,193,629 | A | * | 3/1980 | Merkle | ................... | 296/190.07 |
|---|---|---|---|---|---|---|
| 4,210,362 | A | | 7/1980 | Boersma | | |
| 4,515,234 | A | | 5/1985 | Loy et al. | | |
| 5,044,455 | A | * | 9/1991 | Tecco et al. | ................. | 180/89.13 |
| 7,410,207 | B2 | * | 8/2008 | Fornell et al. | ............ | 296/190.03 |
| 7,722,008 | B2 | * | 5/2010 | Yoon | .............................. | 248/638 |
| 2002/0033288 | A1 | | 3/2002 | Okazawa et al. | | |
| 2002/0158389 | A1 | * | 10/2002 | Yoshida et al. | .......... | 267/140.11 |
| 2003/0107163 | A1 | * | 6/2003 | Asano et al. | ............. | 267/140.12 |
| 2003/0218287 | A1 | * | 11/2003 | Mikami et al. | ................ | 267/293 |
| 2006/0012090 | A1 | * | 1/2006 | Cerri et al. | ............... | 267/140.11 |

FOREIGN PATENT DOCUMENTS

| JP | 3096527 A | 4/1991 |
|---|---|---|
| JP | 5239849 A | 9/1993 |
| JP | 2005170333 A | 6/2005 |
| WO | 2005023628 A1 | 3/2005 |

OTHER PUBLICATIONS

International Search Report for corresponding International Application PCT/SE2006/000437.
International Preliminary Report on Patentability for corresponding International Application PCT/SE2006/000437.

* cited by examiner

*Primary Examiner* — Dennis Pedder
(74) *Attorney, Agent, or Firm* — WRB-IP LLP

(57) ABSTRACT

An arrangement for suspension of an operator cab on a machine frame in order to permit controlled motion of the cab relative to the frame is provided. The arrangement includes at least one first suspension member disposed between an underside of the cab and the frame for supporting the cab on the frame. The arrangement further includes at least one second suspension member disposed between a rear side of the cab and a rigid support structure and wherein the second suspension member is arranged at an elevated position relative to the underside of the cab. The second suspension member is adapted to provide an increased rigidity against cab movements both in the longitudinal and lateral direction of the machine during operation of the work machine.

20 Claims, 11 Drawing Sheets

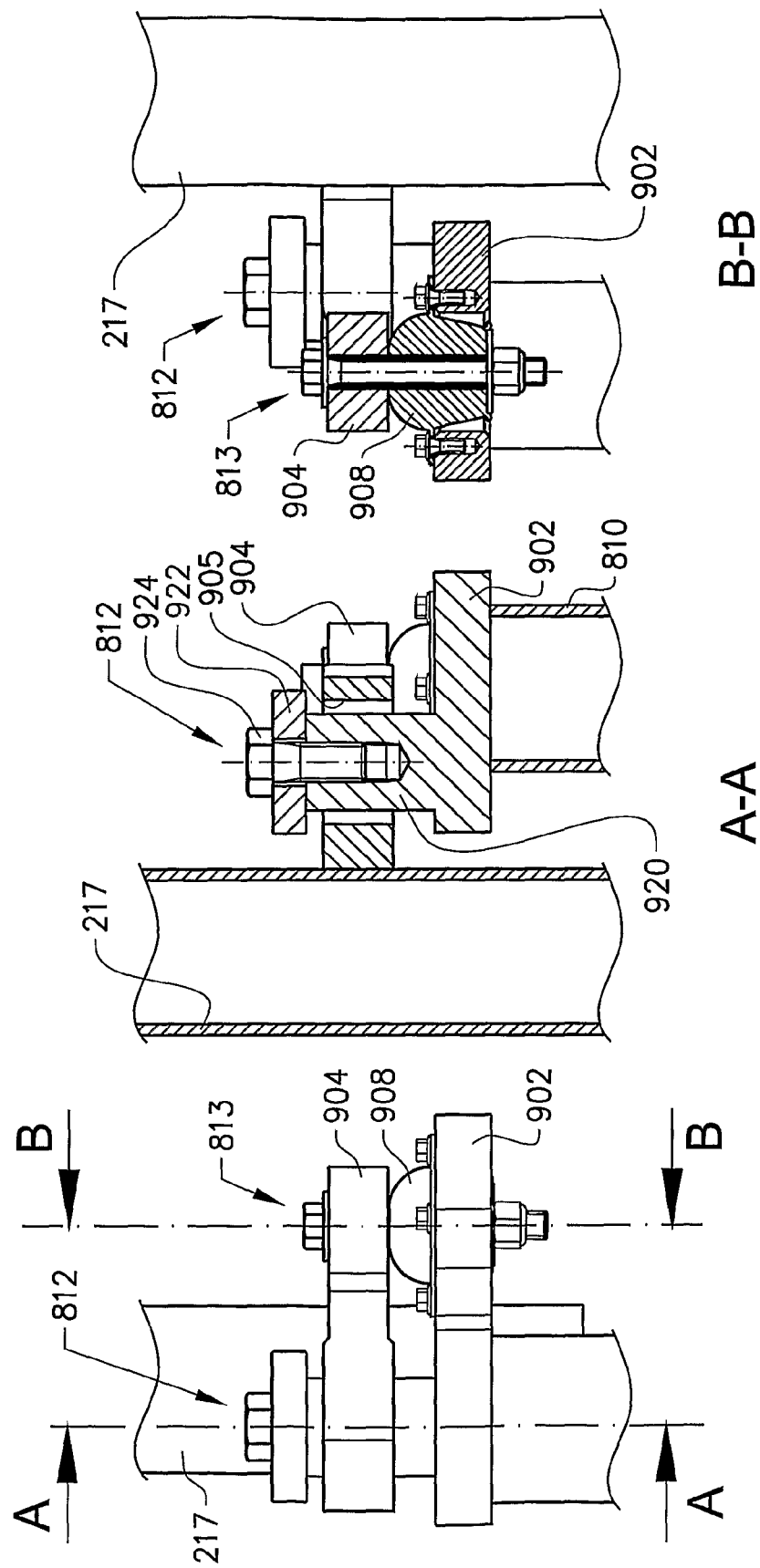

ARRANGEMENT FOR SUSPENSION OF AN OPERATOR CAB ON A WORK MACHINE FRAME

BACKGROUND AND SUMMARY

The present invention relates to an arrangement for suspension of an operator cab on a work machine frame in order to permit controlled motion of the cab relative to the frame. The arrangement comprises at least one first suspension means disposed between an underside of the cab and the frame for supporting the cab on the frame. The arrangement further comprises at least one second suspension means disposed between a rear side of the cab and a rigid support structure. The second suspension means is arranged at an elevated position relative to the underside of the cab. The invention further relates to a work machine comprising the suspension arrangement.

The term "work machine" comprises different types of material handling vehicles like construction machines, such as a wheel loader, a backhoe loader, a motor grader and an excavator. Further terms frequently used for work machines are "earth-moving machinery" and "off-road work machines". The invention will be described below in a case in which it is applied in a frame-steered work machine constituting a wheel loader. This is to be regarded only as an example of a preferred application.

A frame-steered work machine typically comprises a rear vehicle section with a rear frame and a forward vehicle section with a forward frame. The rear frame is connected to the forward frame by means of an articulation joint, which allows pivoting about a vertical axis for steering the machine. Two hydraulic cylinders are provided one on each side of the articulation joint for actuating steering.

The work machines are often utilized in terrain with very uneven surfaces which give rise to strong vibrations and shocks. In order to make the driver's working environment comfortable, the cab must be suspended in such a way that the vibrations and shocks are reduced or eliminated and are thus not transferred directly from the frame of the machine to the cab. This must be achieved with good isolation of structural born sounds.

The wheel loader comprises a work implement, for example a bucket, for moving/transporting material.

According to one example, the wheel loader is used for moving earth, gravel or stones. There is a desire to suspend the cab in order to reduce movements/oscillations of the cab emanating from impacts and shocks from a bucket-filling and/or a bucket-emptying operation.

For reasons of safety, the cab must, in addition, be sufficiently strong to provide the driver with a personal survival space if the machine should roll over onto the cab. In this connection, ROPS requirements are often mentioned, with ROPS standing for Roll Over Protection Structure.

It is desirable to achieve an arrangement for suspension of an operator cab on a work machine frame that improves the working environment for the driver in that relative movements of the cab are reduced during operation while not substantially negatively effecting sound isolation. Especially, the invention aims for a suspension arrangement with increased stability. Further, the invention should not substantially negatively effect the ROPS requirement. The invention is especially directed to a suspension arrangement for a work machine, which creates conditions for reducing relative movements of the cab emanating from travelling over uneven ground. The invention is particularly directed to a suspension arrangement for a work machine, which creates conditions for reducing relative movements of the cab emanating from operation of the work implement (for example the bucket).

According to an aspect of the present invention, the second suspension means is adapted to provide an increased rigidity against cab movements both in the longitudinal and lateral direction of the machine during operation of the work machine.

Some work machines, such as wheel loaders, have a forward axle, which is rigidly connected to the frame, and a rear pendulum axle. This leads to that the rear wheels of the machine may move vertically relative to one another. However, since the forward wheels are rigidly supported to the frame, they will transmit shocks from the ground to the cab during travelling on an uneven ground, such as a bumpy road. By virtue of the invention, such shocks are reduced.

Further, the work machine is provided with a work implement (such as a bucket) for moving a load and/or material. Cab movements result from a counterforce during operation of the work implement in contact with the load and/or material. By virtue of the invention, shocks resulting from operation of the work implement are reduced.

During a bucket-filling operation, the wheel loader is forwarded so that the bucket is driven into earth, stones, gravel or similar. Further, during the bucket-filling operation, the wheel loader is often in an inclined state and will therefore be subjected to a counterforce from the load in an inclined direction relative to a longitudinal direction of the machine. The wheel loader is normally operated for bucket-filling in an angular range of +40° relative to the longitudinal direction in a plane in parallel to the machine frame.

Further, during a bucket-emptying operation, the bucket may be banged sideways in order to remove debris and dirt, which leads to shocks and sideways cab movements.

The working environment for the driver is substantially improved by adapting the second suspension means so that a substantially equal rigidity is achieved against cab movements in directions inclined relative to the longitudinal direction of the machine, i.e. in a substantially horizontal plane. In other words, the cab will move/oscillate substantially in the same way independent of the direction of the counterforce during said operation.

According to a preferred embodiment, the second suspension means has sound isolation characteristics and is adapted to reduce transmission of sounds to the cab in interaction with the rigid support structure. In order to reduce transmission of sounds to the cab during operation, it is required to use a rigid structure. Using the existing rigid support structure behind the cab, which is adapted for the ROPS requirement, creates conditions for an improved controlled motion of the cab while not negatively inflicting the sound isolation characteristics.

According to a further preferred embodiment, the second suspension means and the first suspension means are in combination adapted for a suspension rigidity which is substantially equal in the longitudinal and lateral direction of the machine.

According to a further preferred embodiment, two second suspension means are arranged at a distance from each other sideways of the cab. Preferably, each of the two second suspension means has an axis of increased rigidity oriented towards a centre of the cab in order to provide a substantially equal rigidity against cab movements in directions separate from the longitudinal direction of the vehicle.

According to a further preferred embodiment, the second suspension means is arranged at a level in the vicinity of a centre of gravity of the cab. In this way, the natural frequencies of the cab with regard to oscillations/movements will be optimized/advantageous.

According to a further preferred embodiment, the cab comprises two rear posts at a distance from each other sideways of the cab and that one second suspension means is connected to each post.

According to a further preferred embodiment, the support structure is adapted to support the cab in the event of a considerable inclination of the cab relative to the frame. The support structure is thus arranged to provide a transmission of forces to the cab structure in the event of a specific inclination or canting of the cab being exceeded. The specific inclination corresponds suitably to the driver experiencing the inclination as unpleasant and/or a danger arising that the vehicle will tip over. Thus, this feature fulfils the ROPS requirement.

The cab structure is preferably arranged to essentially move freely relative to the support structure in the event of only a small inclination of the cab structure relative to the support structure.

Other advantageous embodiments of the invention and its associated advantages are apparent from the following description.

BRIEF DESCRIPTION OF DRAWINGS

The invention will be described in greater detail in the following, with reference to the embodiments shown in the attached drawings, in which FIG. 1 schematically shows a wheel loader in a side view, FIG. 10 shows a side view of the rear suspension means in FIG. 9, FIG. 11 shows a cut view of the ROPS connection means in FIG. 10, FIG. 12 shows a cut view of the rear suspension means in FIG. 10.

DETAILED DESCRIPTION OF THE INVENTION

Figure 1:
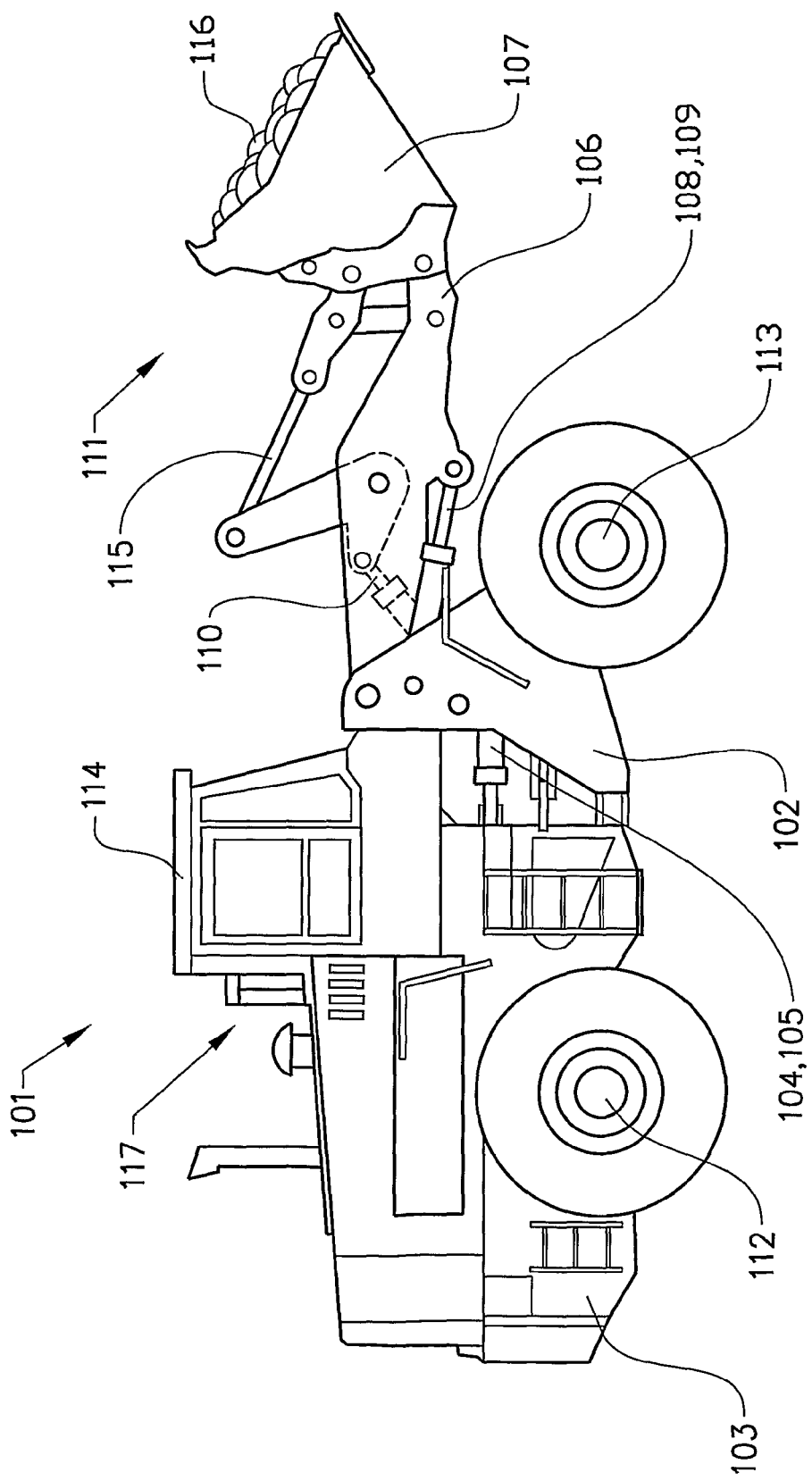

FIG. 1 shows a wheel loader 101. The body of the wheel loader 101 comprises a front body section 102 with a front frame, and a rear body section 103 with a rear frame. A rear axle 112 forms a pendulum axle allowing the right and left wheel to move vertically relative to one another. A forward axle 113 is rigidly connected to the forward frame. The rear body section 103 comprises a cab 114. The body sections 102,103 are connected to each other via an articulation joint in such a way that they can pivot in relation to each other around a vertical axis 601, see FIG. 6. The pivoting motion is achieved by means of two first actuators in the form of hydraulic cylinders 104,105 arranged between the two sections. Thus, the wheel loader is an articulated work vehicle. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106, or boom, and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

A support structure 117 is arranged to support the cab 114 in the event of a considerable inclination of the cab relative to the frame of the vehicle 101. The support structure 117 thus absorbs forces and, in conjunction with the cab 114, forms a sufficiently strong construction to fulfil the ROPS requirement.

Figure 2:
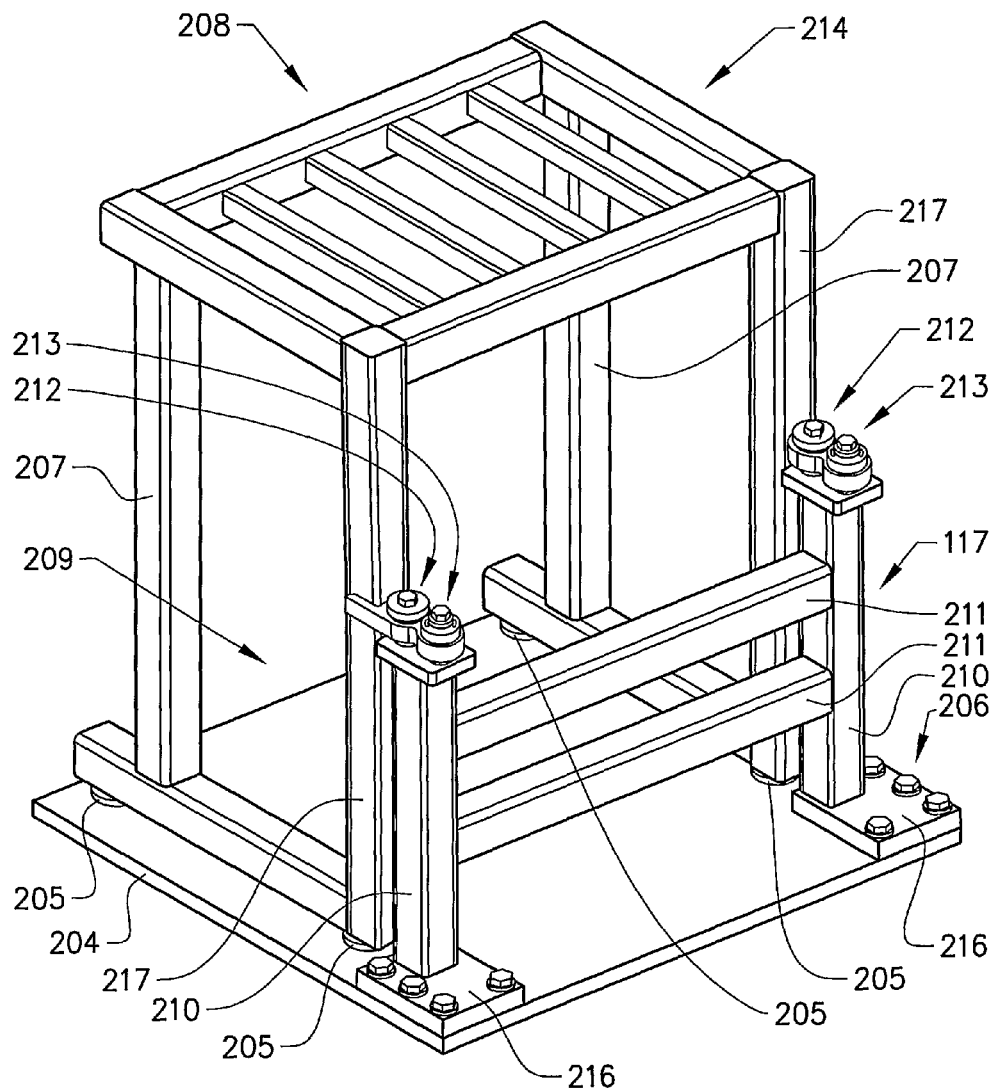
FIG. 2 shows a perspective view from the back of a first embodiment of a cab suspension arrangement.

FIG. 2 shows a perspective view from the back of a cab structure 214 and the rigid support structure 117. The cab structure 214 forms a carcass for the cab 114, i.e. it delimits a driver's working area. The frame is here illustrated by a bottom plate 204.

The cab structure 214 comprises a plurality of elongated construction elements, or beams, that are joined in such a way that together they form a rectangular box shape. In other words, the cab structure 214 is in the shape of a perpendicular block. More specifically, four vertical elongated construction elements 207,217, or posts, are arranged in such a way that they delimit the corners of the perpendicular block. Additional elongated construction elements delimit a horizontal upper plane 208 and lower plane 209.

The suspension arrangement comprises first suspension means 205, or resilient mounting means, disposed between an underside of the cab 114 and a top of the frame 204 for resiliently supporting the cab on the frame. The first suspension means 205 forms resilient cushioning means interposed between the cab and the frame. More specifically, one first suspension means 205 is arranged substantially adjacent each corner of the cab structure 214. The first suspension means 205 is adapted for damping vibration, shocks and/or noise, etc, from the frame 204 of the vehicle. The first suspension means 205 has a main axis of rigidity (i.e. an axis of increased rigidity) oriented in parallel to an upwards direction of the cab. The damping element 205 preferably consists of or comprises an elastomeric member or rubber isolators. Thus, the first suspension means 205 forms anti-vibrational mounts. Further, the first suspension means 205 are adapted to stabilize the cab.

The rigid support structure 117 is arranged at a distance behind the cab structure 214. The support structure 117 comprises a plurality of elongated construction elements, or beams, that are joined together in such a way that together they form a frame or an arch. Two vertical elongated construction elements 210 define the side edges of the support structure. Two horizontal elongated construction elements 211 are arranged between the vertical construction elements 210, or posts, and connect these together. The support structure 117 extends in a plane in parallel to the back side of the cab structure 214. Each of the upright posts 210 is positioned adjacent one of the rear posts 217 in the cab structure 214. The support structure 117 comprises, in addition, means 206 for connecting it securely to the frame 204 of the vehicle. Thus, the rigid support structure 117 is rigidly attached to the frame 204 for movement in unison with the frame. The connecting means 206 comprises two connecting devices 216 spaced a distance apart, each of which comprises a bolt connection.

The support structure 117 extends to an essentially lower height than the height of the cab structure 214 in a vertical direction. More specifically, the support structure 117 extends to a height that is less than 75% of the height of the cab structure 214, and suitably to a height that is approximately 50% of the height of the cab structure. By height is meant here the extent in a vertical direction when the vehicle is in its normal position, that is to say when it is standing on a flat surface. By means of a suitable design of the support structure 117, the driver's view is not affected in the direction, normally backwards, where the support structure is located.

The arrangement 1 comprises, in addition, means 212 for connecting the cab structure 214 to the support structure 117 in such a way that the support structure absorbs the forces which act on the cab structure when the vehicle is in use and which exceed the forces with which the shock-absorbing system 205 can cope. More particularly, said connection means 212 is adapted to absorb forces in all directions, i.e. up-down, lateral and front-back.

In an active mode, the connecting means 212 is adapted to provide a force-transmitting connection between the cab structure 214 and the rigid support structure 117. By active mode is meant that the vehicle is driven in such a way that a certain inclination or canting of the cab structure is exceeded. In addition, in an inactive mode, the said connecting means 212 is arranged to give the cab structure 214 at least essentially freedom of movement without the transmission of forces from the rigid support structure 117. By inactive mode is thus meant the normal mode for normal operation of the vehicle, without a certain inclination or canting being exceeded. By this means, the cab's normal shock-absorbing system can function as normal during normal driving, that is to say, the connecting means is here in the inactive mode. In event of a greater inclination or canting of the cab, however, the support structure provides the intended support, that is to say the connecting means is here in the active mode.

The connecting means 212 thus forms a type of connecting arrangement that permits a certain movement of the cab structure 214 relative to the support structure 117 before the structures are connected together. In the ^connected together" mode, however, they act as a one-piece unit. The connecting means 212 is arranged on an upper part of the support structure 117.

The suspension arrangement further comprises at least one second suspension means 213 disposed between a rear side of the cab structure 214 and the rigid support structure 117. The second suspension means 213 is arranged at an elevated position relative to the underside of the cab. More particularly, the second suspension means 213 is arranged at a level in the vicinity of a centre of gravity of the cab. More particularly, the second suspension means 213 is arranged on an upper part of the support structure 117 and substantially at the same level as the connection means 212.

Further, two second suspension means 213 are arranged at a distance from each other sideways of the cab. More specifically, one second suspension means is connected to each of the rear posts 217 of the cab 114. Thus, the suspension arrangement forms a six-point suspension of the cab.

Figure 3:
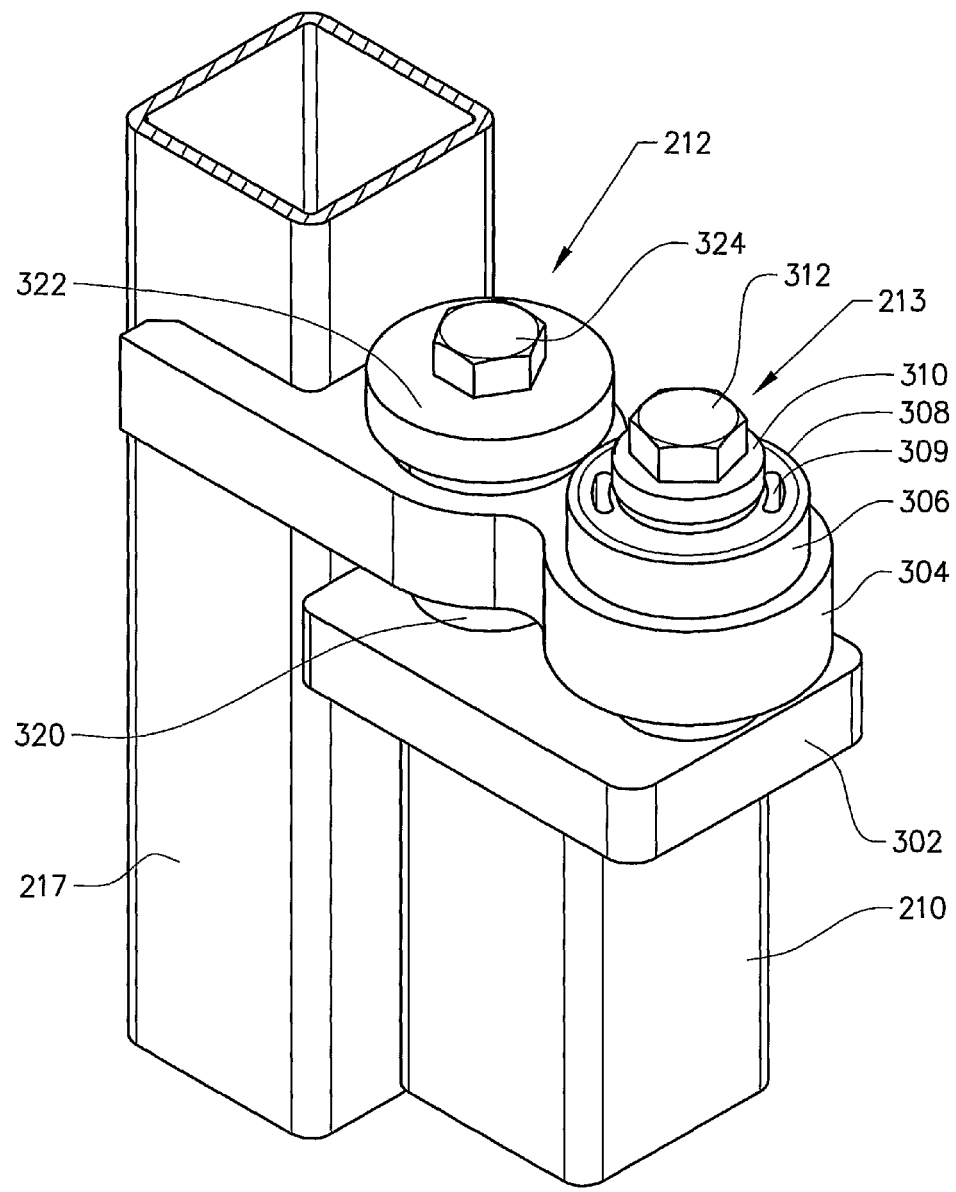
FIG. 3 shows an enlarged view of a rear suspension means and ROPS connection means in FIG. 2.
Figure 4:
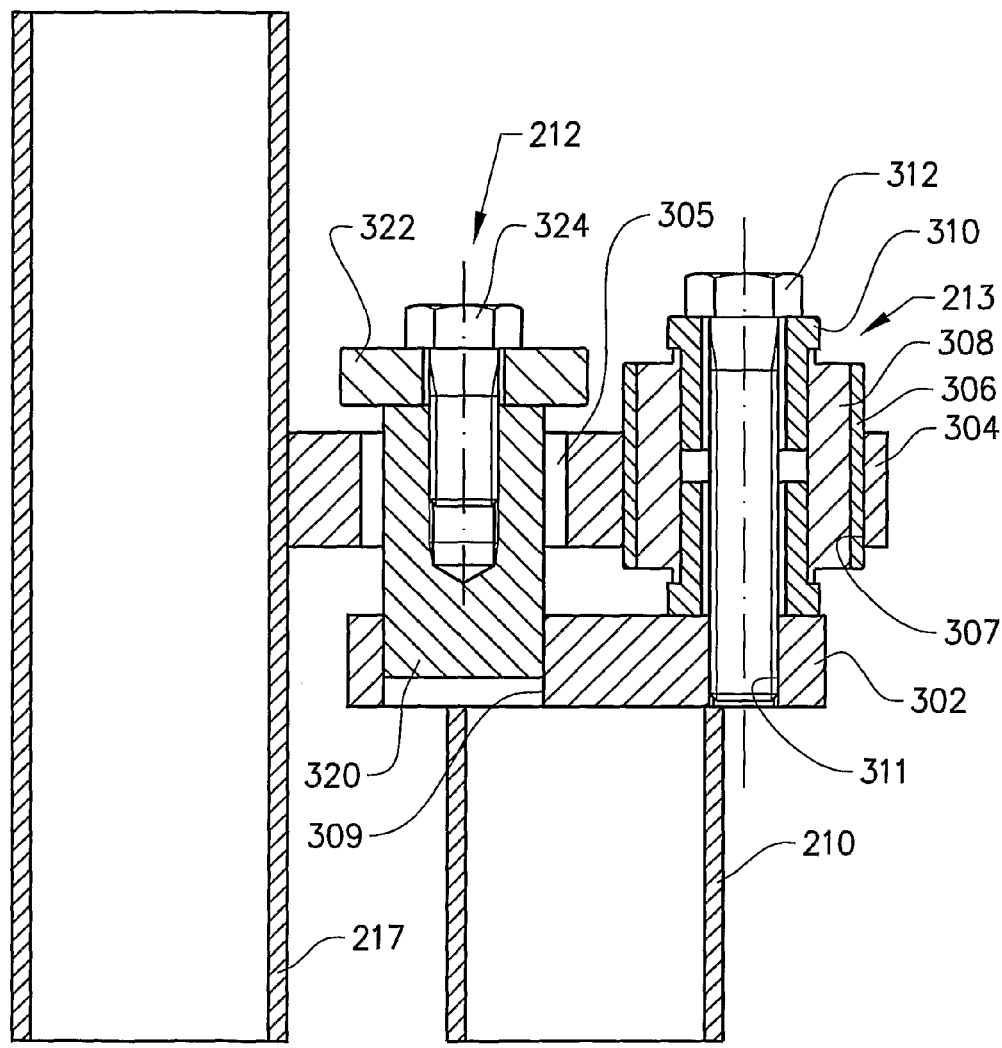
FIG. 4 shows a cut view of the rear suspension means and ROPS connection means in FIG. 3.
Figure 5:
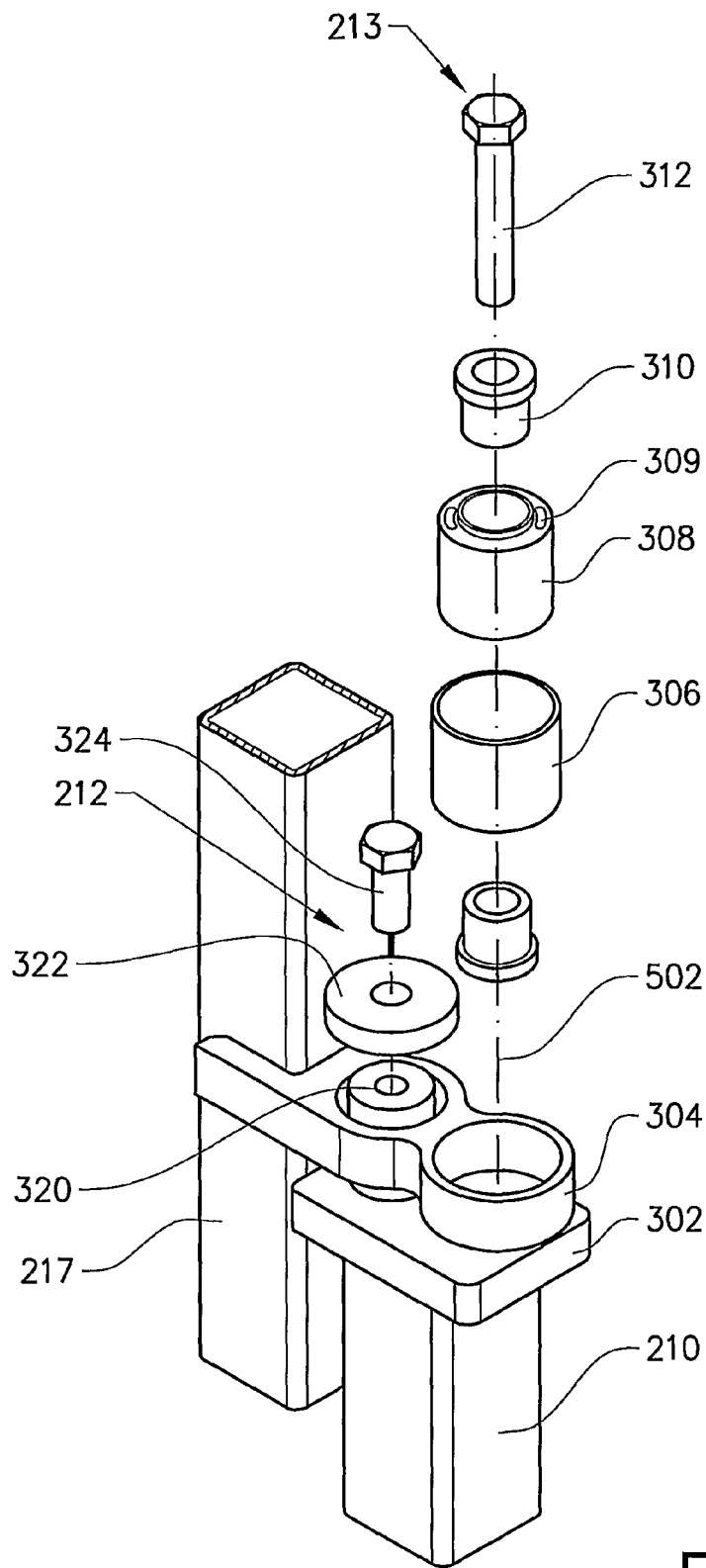
FIG. 5 shows an exploded view of the rear suspension means and ROPS connection means in FIG. 3, FIG. 6 schematically shows, in a view from above, the wheel loader from FIG. 1 in a position, where the frame parts are inclined relative to one another, FIG. 7 schematically shows the axes of rigidity of the rear suspension means in a horizontal plane.

A first embodiment of the arrangement of the connection means 212 and the second suspension means 213 relative to the cab structure 214 and the support structure 117 will be described below with reference to FIGS. 3-5.

A construction element in the form of a flat connection part, or plate, 304 is rigidly attached to the rear post 217 just above the top of the support structure 117 and extends substantially horizontally from the rear post 217 to a position above the associated rear post 210 of the support structure 117. The connection element 304 comprises two spaced openings 305, 307. Further, an attachment plate 302 is attached on top of the rear post 210 of the support structure 117. The attachment plate 302 is also provided with two spaced openings 309,311. Further, the connection element 304 and the attachment plate 302 are positioned relative to one another so that the openings 305,309,307,311 coincide pairwise. The connection means 212 is positioned in a first pair 305,309 of said openings and the second suspension means 213 is positioned in a second pair 307,311 of said openings. The connection means 212 and the second suspension means 213 are arranged next to each other through said openings in the connection part 304 and the attachment plate 302.

The second suspension means 213 is spaced from the connection means 212 of the support structure at each rear cab post. More specifically, the second suspension means 213 is separate from the connection means 212 of the support structure at each rear cab post. Each of the second suspension means 213 and the connection means 212 may therefore be designed and dimensioned for its respective function. The suspension means 213 is designed for its suspension effect only and is preferably adapted to break in the event of the vehicle rolling over. Further, the connection means 212 will only be active when the certain relative inclination of the cab relative to the frame is exceeded, and during a roll over.

The second suspension means 213 comprises a resilient cushioning member 308 in the form of a cylindrical rubber element. The resilient cushioning member 308 is received in an outer sleeve 306, which is arranged in the opening through the connection part 304 and in contact with the opening wall. The resilient cushioning member 308 is hollow and has a central through hole and receives an inner sleeve 310, which in turn receives a screw 312. The screw extends through the opening 311 in the attachment plate 302 and mechanically connects the support structure 117 to the cab structure 214.

The connection means 212 comprises a force transmitting element 320, which is rigidly secured to the support structure 117 via the attachment plate 302. The force transmitting element 320 is arranged in such a manner relative to the cab 114 that the cab has at least essentially freedom of movement without the transmission of forces from the support structure 117 as long as the inclination of the cab 114 relative to the frame 204 does not exceed a predetermined angle. More specifically, the force transmitting element 320 has a smaller outer extension than the inner dimension of the opening 305, leaving a gap for said freedom of movement. Further a washer 322 is attached on top of the force transmitting element 320 via a screw 324.

Each of the second suspension means 213 has an axis of increased rigidity oriented in parallel to an upwards direction of the cab. More specifically, the cylindrical resilient cushioning member 308 is positioned with a centre axis 502, see FIG. 5, in parallel to an upwards direction of the cab, i.e. in a vertical direction. In other words, the cylindrical resilient cushioning member 308 is positioned with a centre axis 502 in parallel to an extension direction of the cab corner post 217.

Further, the resilient cushioning member 308 comprises structure 309 for achieving a further axis of increased rigidity 701 (see FIG. 7) perpendicular to said centre axis 502, i.e. in a horizontal direction. More specifically, two recesses 309 are provided in the resilient cushioning member 308 uniformly on opposite sides of the centre axis 502. The recesses 309 extend a distance into the cylindrical cushioning member in parallel to the centre axis and are distributed uniformly with regard to a centre plane through the centre axis. The function of the axis of rigidity 701 will be described further below with reference to FIGS. 6-7.

The second suspension means 213 is adapted to provide an increased rigidity against cab movements in the longitudinal direction 618 and in lateral directions of the vehicle 101. The second suspension means 213 therefore has an axis of increased rigidity 701 oriented with a component in the longitudinal direction 618 of the vehicle 101, see FIG. 7. This is achieved in that the resilient cushioning member 308 comprises said structure of two opposite recesses 309. More specifically, a plane through the centre line 502 and the recesses 309 defines a weak axis and a plane perpendicularly to the weak axis defines the axis of increased rigidity 701. More specifically, the axis of increased rigidity 701 is directed towards a centre of gravity of the cab. Further, the resilient cushioning member 308 is angularly positioned in such a manner that the axis of increased rigidity is oriented with a component in the longitudinal direction 618 of the vehicle 101, see FIG. 7.

Figure 6:
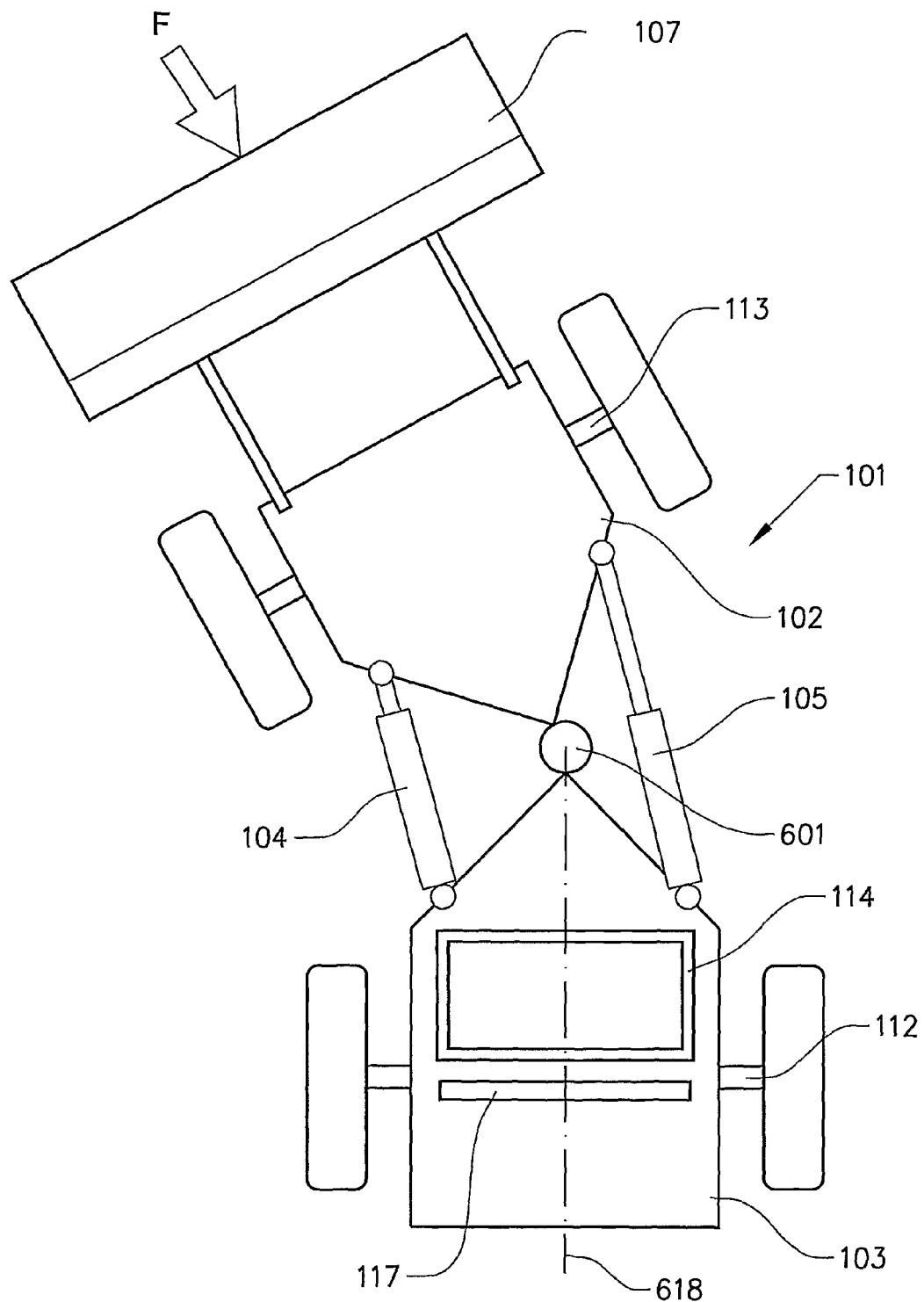

The wheel loader 101 is schematically shown in a top view in FIG. 6 during a bucket-filling operation. More specifically, the wheel loader 101 is forwarded so that the bucket is inserted into earth, stones, gravel or similar. The wheel loader 101 is subjected to the counterforce F from the material. The counterforce F acts in an inclined direction relative to a longitudinal axis 618 of the vehicle since the vehicle sections 102,103 are inclined relative to one another. The wheel loader 101 is normally operated for bucket-filling in an angular range of +40° relative to the longitudinal direction 618.

There is a desire to design the cab suspension in such a manner that the cab 114 will move/oscillate substantially in the same way independent of the direction of the counterforce F during said operation.

The second suspension means 213 is therefore adapted to provide a substantially equal rigidity against cab movements in directions inclined relative to the longitudinal direction of the vehicle. Each of the two second suspension means 213 has the axis of increased rigidity 701 oriented towards a centre 702 of the cab in order to provide a substantially equal rigidity against cab movements in said directions separate from the longitudinal direction of the vehicle.

Further, the second suspension means 213 is adapted to support the first suspension means 205 at the underside of the cab for damping vibration, shocks and/or noise, etc, from the frame 204 of the vehicle.

Further, the second suspension means 213 is matched relative to the first suspension means 205 so as to achieve a substantially clean vertical natural frequency in order to achieve a substantially uniform resilience with regard to vertical cab movements.

Further, the second suspension means 213 is matched relative to the first suspension means 205 so as to achieve a substantially clean natural frequency with regard to longitudinal-pitch movements. Further, the second suspension means 213 is matched relative to the first suspension means 205 so as to achieve a substantially clean natural frequency for the lateral-roll. Further, the natural frequencies for longitudinal-roll movements and lateral-roll movements should be substantially the same (or at least near each other).

Further, the second suspension means 213 is matched relative to the first suspension means 205 so as to achieve a substantially clean natural frequency with regard to yaw movements.

Figure 8:
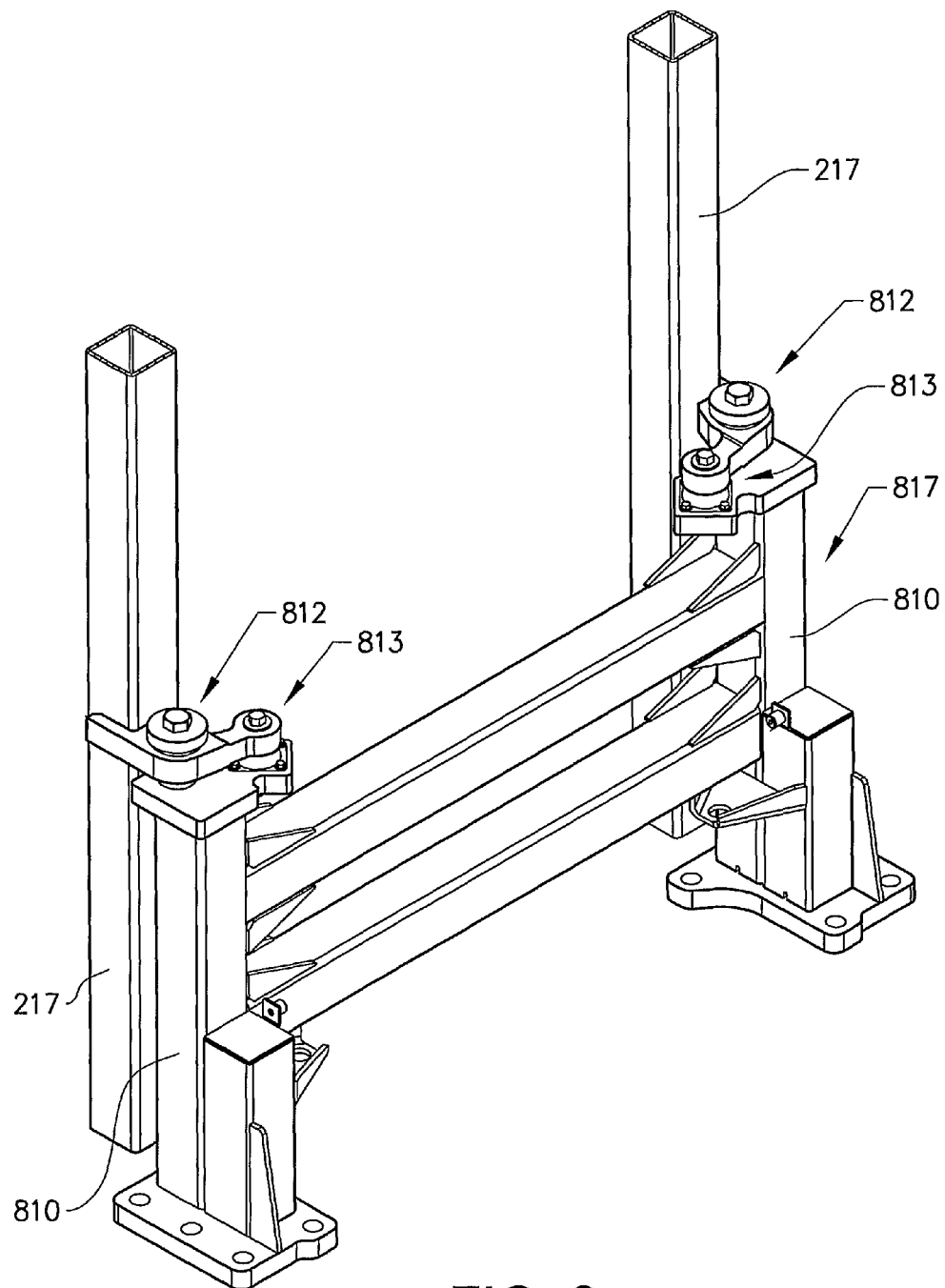
FIG. 8 shows a perspective view from the back of a second embodiment of a cab suspension arrangement.
Figure 9:
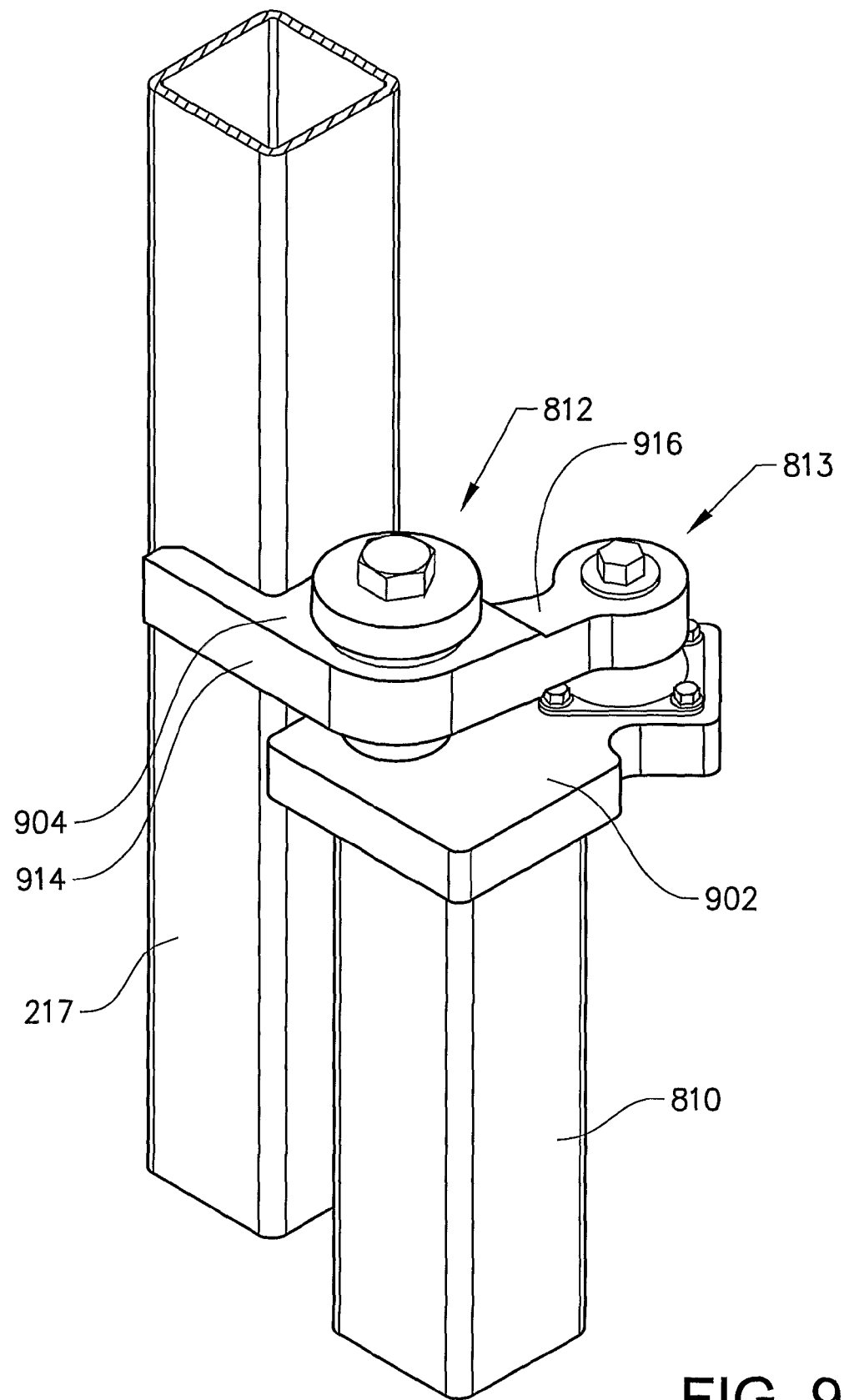
FIG. 9 shows an enlarged view of a rear suspension means and ROPS connection means from FIG. 8.
Figure 13:
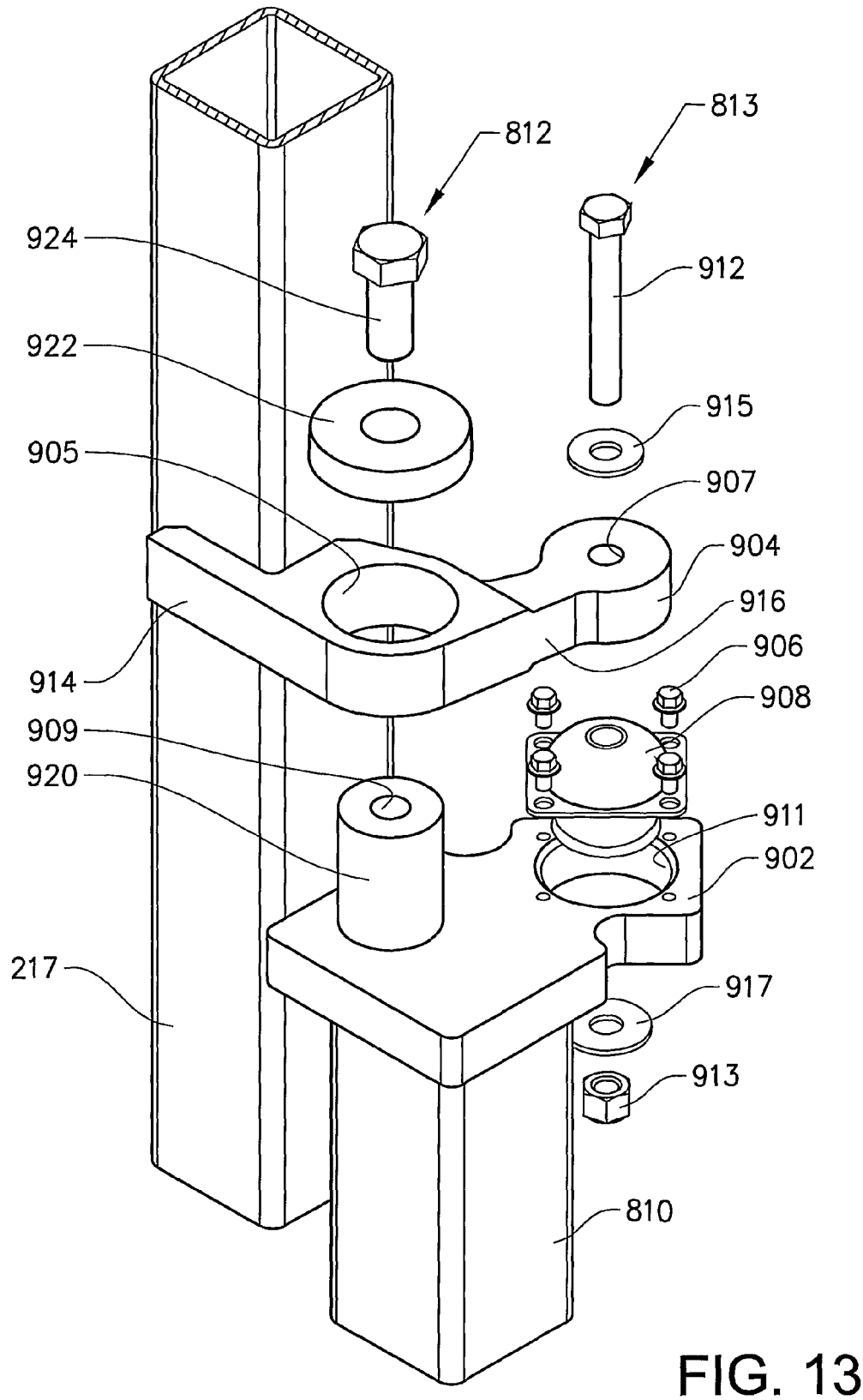
FIG. 13 shows an exploded view of the rear suspension means and ROPS connection means in FIG. 9.

FIGS. 8-13 show a second embodiment of the suspension arrangement. A rigid support structure 817, see FIG. 8, is rigidly attached to the vehicle frame and positioned behind the rear cab posts 217 in a similar manner as has been described above with regard to FIG. 2. An upstanding post 810 of the rigid support structure is in the vicinity of and in parallel with each of the rear posts 217 of the cab. A ROPS connection means 812 and a second suspension means 813 are arranged between the cab and the rigid support structure 817 in an operatively interactive manner. The second embodiment of the suspension arrangement will be further described below with reference to FIG. 9-13.

A construction element in the form of a flat connection part, or plate, 904 is rigidly attached to the rear post 217 just above the top of the support structure 817 and extends substantially horizontally from the rear post 217 to a position above the associated rear post 810 of the support structure. The connection element 904 comprises two spaced openings 905, 907, see FIG. 13. Further, an attachment plate 902 is attached on top of the rear post 810 of the support structure. The attachment plate 902 is also provided with two spaced openings 909,911. One of said openings 909 is arranged in an upright, rigid part 920 extending from the attachment plate 902 and the other opening 911 forms a hole extending through the plate 902. The connection element 904 and the attachment plate 902 are positioned relative to one another so that the openings 905,909,907,911 coincide pairwise. The upright, rigid part 920 is received in the opening 905. The function of the connection means 812 is achieved in that the upright, rigid part 920 is secured to the cab post 217 via a bolt 812 and washer 922. The second suspension means 813 is positioned in a second pair 907,911 of said openings. The connection means 812 and the second suspension means 813 are arranged next to each other through said openings in the connection part 904 and the attachment plate 902.

The second suspension means 813 is positioned on the inside of the respective post 810 with respect to the cab direction. More precisely, the connection element 904 comprises a first leg 914 and a second leg 916, which is inclined with regard to the first leg. One of said openings 905 is arranged in the inclination area and the other opening 907 is arranged on the second leg 916, see FIG. 13. In this way, the left and right second suspension means 813 will be positioned at a smaller distance relative to one another than the left and right posts 810 of the rigid support structure.

The second suspension means 813 comprises a resilient cushioning member 908 in the form of a rubber element. The resilient cushioning member 908 is rigidly secured to the attachment plate 902 via a bolt connection 906. The resilient cushioning member 908 is hollow and has a central through hole for receiving a screw 912. The screw 912 extends through the opening 907 in the connection element 904, the through hole in the resilient cushioning member 908 and mechanically connects the support structure 817 to the cab structure. A nut 913 is used for securing the screw 912 in said position. Further a washer 915,917 is arranged between the screw head and the connection element 904 and between the nut 913 and the attachment plate 902, respectively.

Figure 7:
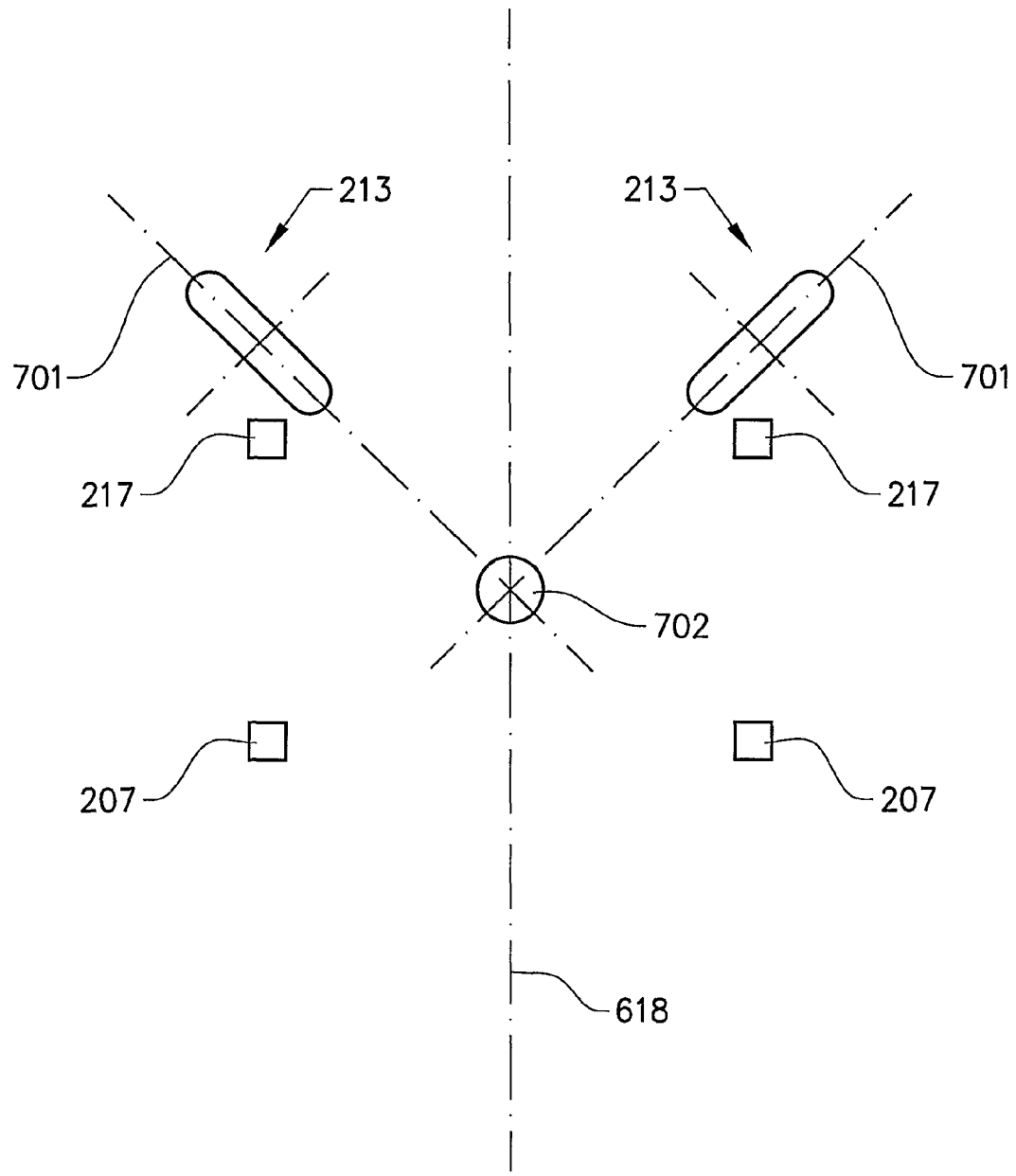

The cushioning member 908 according to the second embodiment is adapted to provide similar characteristics as the cushioning member 208 according to the first embodiment with regard to axes of increased rigidity 701, see FIG. 7. This characteristics is achieved in that the rubber element is provided with recesses (not shown) in a similar manner as has been disclosed for the cushioning member 208 according to the first embodiment. Further, the cushioning member 908 is angularly positioned in such a manner that the axis of increased rigidity is oriented in the direction shown in FIG. 7.

The connection means 212 comprises a force transmitting element 920, which is rigidly secured to the support structure 117 via the attachment plate 902. The force transmitting element 920 is arranged in such a manner relative to the cab that the cab has at least essentially freedom of movement without the transmission of forces from the support structure 817 as long as the inclination of the cab relative to the frame does not exceed a predetermined angle. More specifically, the force transmitting element 920 has a smaller outer extension than the inner dimension of the opening 905, leaving a gap for said freedom of movement. Further a washer 922 is attached on top of the force transmitting element 920 via a screw 924.

The invention is not to be considered to be limited to the embodiments described above, a number of additional variants and modifications being possible within the framework of the following patents claims.

The connecting means 212 for the ROPS requirement can, for example, comprise a pin, a fork-shaped element or a claw-shaped element. In the case with the fork-shaped element, it is possible, for example, for the fork-shaped element to project horizontally from the cab structure and to engage with a correspondingly-shaped engagement element that projects vertically from the support structure. In the case of a claw-shaped element, it may be rigidly attached to the cab structure 214 and extend downwards in parallel to the associated elongated element. The vertical beams of the support structure are open upwards in order to receive the claw shaped elements extending downwards. Many variants of the connection means are possible.

The invention claimed is:

1. An arrangement for suspension of an operator cab on a work machine frame, the arrangement comprising at least one first suspension member adapted to be disposed between an underside of the cab and the frame for supporting the cab on the frame, and at least two second suspension members adapted to be disposed rearward of the cab between a rear side of the cab and a rigid support structure, wherein the two second suspension members are adapted to be arranged at a distance from each other sideways of the cab and wherein the second suspension members are adapted to be arranged at an elevated position relative to the underside of the cab, wherein each of the at least two second suspension members comprises a cylindrical resilient cushioning member having a center axis that is parallel with a vertical direction of the cab, wherein each of the resilient cushioning members comprises two recesses uniformly distributed on opposite sides of the center axis and extending into the cushioning member in a direction parallel to the center axis, each of the recesses has an axis defined by a plane perpendicular to a plane through the center axis and the recesses, and wherein the axis of each of the recesses is adapted to be directed towards a center of gravity of the cab.

2. The arrangement as claimed in claim 1, wherein the second suspension members have isolation characteristics and are adapted to reduce transmission of sounds to the cab in interaction with the rigid support structure.

3. The arrangement as claimed in claim 1, wherein the second suspension member and the first suspension member are in combination adapted for a suspension rigidity which is substantially equal in the longitudinal and lateral direction of the machine.

4. The arrangement as claimed in claim 1, wherein the second suspension members have an axis of rigidity oriented in parallel to an upwards direction of the cab.

5. The arrangement as claimed in claim 1, wherein the second suspension members are arranged at a level in the vicinity of a center of gravity of the cab.

6. The arrangement as claimed in claim 1, wherein the cab comprises two rear posts at a distance from each other sideways of the cab and one second suspension member is connected to each post.

7. The arrangement as claimed in claim 1, wherein the support structure is adapted to support the cab in the event of inclination of the cab relative to the frame beyond a predetermined inclination.

8. The arrangement as claimed in claim 7, wherein the arrangement comprises means for mechanically connecting the cab to the support structure in the event of the inclination of the cab relative to the frame beyond the predetermined inclination.

9. An arrangement for suspension of an operator cab on a work machine frame, the arrangement comprising at least one first suspension member adapted to be disposed between an underside of the cab and the frame for supporting the cab on the frame, and at least two second suspension members adapted to be disposed between a rear side of the cab and a rigid support structure, wherein the two second suspension members are arranged at a distance from each other sideways of the cab and wherein the second suspension members are arranged at an elevated position relative to the underside of the cab, wherein each of the at least two second suspension members comprises a cylindrical resilient cushioning member having a center axis that is parallel with a vertical direction of the cab, wherein each of the resilient cushioning members comprises two recesses uniformly distributed on opposite sides of the center axis and extending into the cushioning member in a direction parallel to the center axis, each of the recesses has an axis defined by a plane perpendicular to a plane through the center axis and the recesses, and wherein the axis of each of the recesses is directed towards a center of gravity of the cab, wherein the support structure has an active mode in which it supports the cab in the event of an inclination of the cab relative to the frame beyond a predetermined inclination, the arrangement comprises means for mechanically connecting the cab to the support structure in the event of the inclination of the cab relative to the frame beyond the predetermined inclination, and, in the active mode, the connecting means is adapted to transmit forces between the cab and the support structure and, in an inactive mode, in which the cab is inclined less than the predetermined inclination, the connecting means provides the cab with at least substantially freedom of movement without the transmission of forces from the support structure.

10. The arrangement as claimed in claim 8, wherein the cab comprises two rear posts at a distance from each other sideways of the cab and wherein one connection means is disposed at each of the two rear cab posts and each second suspension member is separate from the connection means at each rear cab post.

11. The arrangement as claimed in claim 1, wherein the second suspension members each comprise a resilient cushioning member in operative contact with the cab and the rigid support structure.

12. The arrangement as claimed in claim 11, wherein the resilient cushioning member comprises structure for achieving at least one main axis of rigidity.

13. The arrangement as claimed in claim 1, wherein the support structure is positioned at least to a substantial extent behind the cab in the machine's intended driving direction.

14. The arrangement as claimed in claim 1, wherein one first suspension member is arranged at each corner of the cab.

15. The arrangement as claimed in claim 1, wherein the cab has four corners and one first suspension member is arranged substantially adjacent each corner.

16. Work machine comprising a frame, a cab and a suspension arrangement, the suspension arrangement comprising at least one first suspension member disposed between an underside of the cab and the frame for supporting the cab on the frame, and at least two second suspension members disposed rearward of the cab between a rear side of the cab and a rigid support structure, wherein the two second suspension members are arranged at a distance from each other sideways of the cab and wherein the second suspension members are arranged at an elevated position relative to the underside of the cab, wherein each of the at least two second suspension members comprises a cylindrical resilient cushioning member having a center axis that is parallel with a vertical direction of the cab, wherein each of the resilient cushioning members comprises two recesses uniformly distributed on opposite sides of the center axis and extending into the cushioning member in a direction parallel to the center axis, each of the recesses has an axis defined by a plane perpendicular to a plane through the center axis and the recesses, and wherein the axis of each of the recesses is directed towards a center of gravity of the cab.

17. Work machine according to claim 16 comprising a forward frame, a rear frame and an articulation joint connecting the forward frame to the rear frame, which allows pivoting about a vertical axis for steering the machine.

18. Work machine according to claim 16, comprising a forward axle, which is rigidly connected to a vehicle frame, and a rear axle, which forms a pendulum axle connected to the vehicle frame.

19. Work machine according to claim 16, comprising a work implement for at least one of moving and affecting at least one of a load and material.

20. An arrangement for suspension of an operator cab on a work machine frame, the arrangement comprising at least one first suspension member adapted to be disposed between an underside of the cab and the frame for supporting the cab on the frame, and at least two second suspension members adapted to be disposed rearward of the cab between a rear side of the cab and a rigid support structure, wherein each of the at least two second suspension members comprises a cylindrical resilient cushioning member having a center axis that is parallel with a vertical direction of the cab, wherein each of the resilient cushioning members comprises two recesses uniformly distributed on opposite sides of the center axis and extending into the cushioning member in a direction parallel to the center axis, each of the recesses has an axis defined by a plane perpendicular to a plane through the center axis and the recesses, and wherein the axis of each of the recesses is directed towards a center of gravity of the cab.

* * * * *